(12) United States Patent
Yanase

(10) Patent No.: US 7,057,526 B2
(45) Date of Patent: Jun. 6, 2006

(54) METHOD AND APPARATUS FOR DETECTING DECREASE IN TIRE AIR-PRESSURE AND PROGRAM FOR JUDGING DECOMPRESSION OF TIRE

(75) Inventor: Minao Yanase, Kobe (JP)

(73) Assignee: Sumitomo Rubber Industries, Ltd., Kobe (JP)

(*) Notice: Subject to any disclaimer, the term of this patent is extended or adjusted under 35 U.S.C. 154(b) by 519 days.

(21) Appl. No.: 10/459,460

(22) Filed: Jun. 12, 2003

(65) Prior Publication Data

US 2003/0233209 A1 Dec. 18, 2003

(30) Foreign Application Priority Data

Jun. 13, 2002 (JP) .............................. 2002-173084

(51) Int. Cl.
*G08B 21/08* (2006.01)

(52) U.S. Cl. ..................... 340/870.16; 340/426.33; 73/146; 73/146.3; 73/146.4

(58) Field of Classification Search ........... 340/426.33, 340/870.16; 73/146, 146.3, 146.4
See application file for complete search history.

(56) References Cited

U.S. PATENT DOCUMENTS 5,498,072 A * 3/1996 Shimizu ..................... 303/191
6,067,035 A * 5/2000 Kosak et al. ............... 341/120
6,285,280 B1 * 9/2001 Wang ......................... 340/444
6,420,966 B1 * 7/2002 Sugisawa .................... 340/442
6,897,770 B1 * 5/2005 Lill ............................ 340/445

FOREIGN PATENT DOCUMENTS

| DE | 100 58 097 A1 | 8/2001 |
|---|---|---|
| EP | 0 783 983 A1 | 7/1997 |
| EP | 0 908 331 A2 | 4/1999 |
| EP | 1 190 874 A2 | 3/2002 |
| JP | 9-203678 A | 8/1997 |
| JP | 11-170828 A | 6/1999 |
| JP | 2002-59724 A | 2/2002 |
| JP | 2002-87031 A | 3/2002 |

* cited by examiner

*Primary Examiner*—Albert K. Wong
(74) *Attorney, Agent, or Firm*—Birch, Stewart, Kolasch & Birch, LLP

(57) ABSTRACT

A method for detecting decrease in tire air-pressure in which decrease in internal pressure of a tire is detected on the basis of wheel speed information obtained from wheels attached to a vehicle. The method includes the steps of: detecting wheel speed information of the respective tires; storing the wheel speed information of the respective tires; obtaining a vehicle body velocity of the vehicle; obtaining vehicle information of the vehicle during running such as driving force, wheel torque or slip rate; calculating a judged value of decompression; and detecting decrease in air-pressure of a tire upon calculating a multiple correlation coefficient for the judged value between the vehicle body velocity and the vehicle information and comparing the multiple correlation coefficient with a specified threshold. It is possible to accurately detect decompression of a tire.

8 Claims, 2 Drawing Sheets

METHOD AND APPARATUS FOR DETECTING DECREASE IN TIRE AIR-PRESSURE AND PROGRAM FOR JUDGING DECOMPRESSION OF TIRE

BACKGROUND OF THE INVENTION

The present invention relates to a method and apparatus for detecting decrease in tire air-pressure and a program for judging decompression of a tire.

An apparatus A in which decompression of the driving wheel is detected on the basis of a correlation between driving force and a difference in wheel speeds on the right and left caused through decompression of either of the right and left driving wheels is conventionally known (see, for instance, Japanese Unexamined Patent Publication No. 2002-59724).

However, such an apparatus A does not consider effects of centrifugal force. It is accordingly difficult to perform accurate judgment of decompression in all speed ranges.

In contrast thereto, there are also known an apparatus B (see, for instance, Japanese Unexamined Patent Publication No. 203678/1997) and an apparatus C (see, for instance, Japanese Unexamined Patent Publication No. 2002-87031) in which decompression is judged by utilizing the fact that a judged value for decompression which is introduced from relative comparison of wheel speed information is correlated to velocity, since a decompressed tire is more strongly affected through centrifugal force when compared to a tire of normal internal pressure, since a decompressed tire is less apt to slip when driving force is applied thereto (the dynamic load radius becomes larger) and since the driving force is correlated to velocity.

In the apparatus B, decompression is judged by utilizing data at the time of deceleration in view of the fact that the slip amount of a decompressed tire decreases when performing driving and that the driving force is correlated to velocity.

However, since only data are accumulated when the vehicle is in a non-driving condition in such an apparatus B, the number of occasions for judging decompression is small, and no attention is being paid to influences of centrifugal force. It is accordingly difficult to perform accurate judgment of decompression in all speed ranges.

On the other hand, while the apparatus C only considers influences of centrifugal force through velocity, this also means that, as a result, influences of driving force are being considered as well, since velocity is correlated to driving torque. In this manner, by incorporating a means for detecting decrease in internal pressure on the basis of relative differences in wheel speed information of tires in the apparatus C, it is possible to perform judgment of decompression of a tire in both of the high speed region and the low speed region.

However, this apparatus C does not consider increases and decreases in wheel torque (running resistance) owing to gradients of sloped roads or accelerations/decelerations of a vehicle. Since the driving force might also change irrespective of the velocity but owing to gradients of road surfaces (sloped roads) or accelerations/decelerations, when decompression is judged on the basis of the correlation with the velocity alone, occasions of performing judgment might become less.

Moreover, since none of the conventional apparatuses A, B and C consider influences of using tires in a mixed manner, erroneous alarm might be issued on the basis of a relative speed ratio (right and left wheel ratio) between right and left tires of the driving wheels which are of different types even though the tires are at normal internal pressure when, for instance, tires of the driving wheels are exchanged to different types of tires with different degrees of wear or front/rear rigidities.

SUMMARY OF THE INVENTION

In view of the above facts, it is an object of the present invention to provide a method and apparatus for detecting decrease in tire air-pressure and a program for judging decompression of a tire with which it is possible to accurately detect decompression of a tire and with which it is possible to prevent erroneous alarm.

In accordance with a first aspect of the present invention, there is provided a method for detecting decrease in tire air-pressure in which decrease in internal pressure of a tire is detected on the basis of wheel speed information obtained from wheels attached to a vehicle. The method includes the steps of: detecting wheel speed information of the respective tires; storing the wheel speed information of the respective tires; obtaining a vehicle body velocity of the vehicle on the basis of the wheel speed information; obtaining vehicle information of the vehicle during running such as driving force, wheel torque or slip rate; calculating a judged value of decompression on the basis of wheel speed information of the respective tires; and detecting decrease in air-pressure of a tire upon calculating a multiple correlation coefficient for the judged value between the vehicle body velocity and the vehicle information and comparing the multiple correlation coefficient with a specified threshold.

In accordance with a second aspect of the present invention, there is provided an apparatus for detecting decrease in tire air-pressure in which decrease in internal pressure of a tire is detected on the basis of wheel speed information obtained from wheels attached to a vehicle. The apparatus includes: wheel speed information detecting means which detect wheel speed information of the respective tires; a memory means which stores the wheel speed information of the respective tires;

a velocity calculating means which obtains a vehicle body velocity of the vehicle on the basis of the wheel speed information; a vehicle information calculating means which obtains vehicle information of the vehicle during running such as driving force, wheel torque or slip rate; a judged value calculating means which calculates a judged value of decompression on the basis of wheel speed information of the respective tires; and a detecting means which detects decrease in air-pressure of a tire upon calculating a multiple correlation coefficient for the judged value between the vehicle body velocity and the vehicle information and comparing the multiple correlation coefficient with a specified threshold.

In accordance with a third aspect of the present invention, there is provided a program for judging decompression of a tire, wherein for judging decrease in tire air-pressure, a computer is made to function as a memory means which stores the wheel speed information of the respective tires; a velocity calculating means which obtains a vehicle body velocity of the vehicle on the basis of the wheel speed information; a vehicle information calculating means which obtains vehicle information of the vehicle during running such as driving force, wheel torque or slip rate; a judged value calculating means which calculates a judged value of decompression on the basis of wheel speed information of the respective tires; and a detecting means which detects decrease in air-pressure of a tire upon calculating a multiple correlation coefficient for the judged value between the vehicle body velocity and the driving wheel and comparing the multiple correlation coefficient with a specified threshold.

DETAILED DESCRIPTION

The method and apparatus for detecting decrease in tire air-pressure and the program for judging decompression of a tire according to the present invention will now be explained on the basis of the accompanying drawings.

Figure 1:
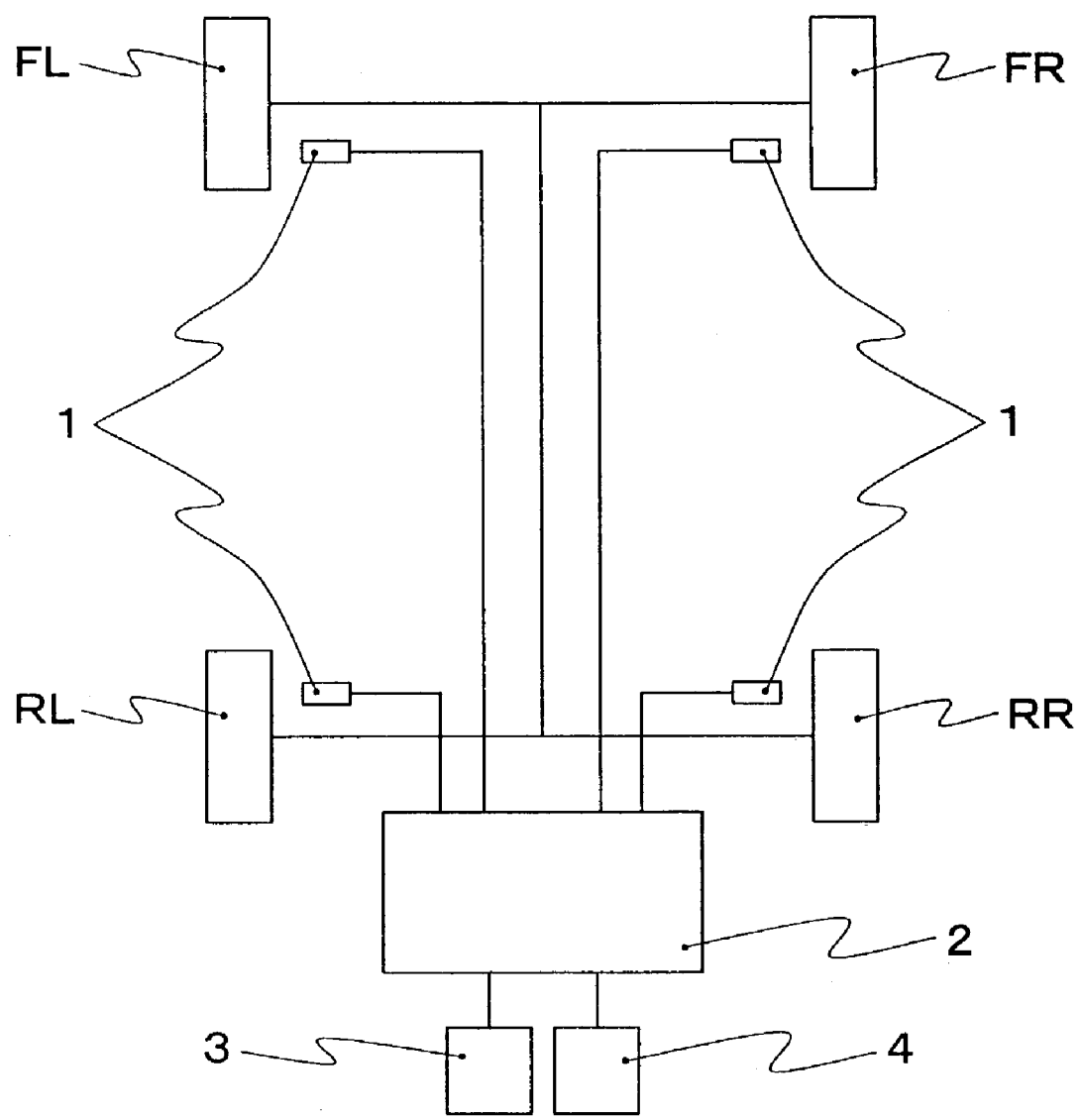
FIG. 1 is a block diagram illustrating one embodiment of the apparatus for detecting decrease in tire air-pressure according to the present invention.

As illustrated in FIG. 1, the apparatus for detecting decrease in tire air-pressure according to one embodiment of the present invention is for detecting whether any of air-pressures of four tires FL, FR, RL and RR (hereinafter generally referred to as Wi, wherein i=1 to 4, 1: front left tire, 2: front right tire, 3: rear left tire, 4: rear right tire) attached to a four-wheeled vehicle is decreased or not, and is equipped with ordinary wheel speed information detecting means 1 provided in relation to the respective tires Wi.

The wheel speed information detecting means 1 might be a wheel speed sensor for measuring wheel speed (rotational velocity) of wheel speed information on the basis of number of pulses upon generating rotational pulses by using an electromagnetic pickup or similar, or an angular velocity sensor in which power is generated through rotation such as in a dynamo, wherein the wheel speed is measured from a voltage thereof. Outputs of the wheel speed information detecting means 1 are supplied to a control unit 2 which might be a computer such as an ABS. A display 3 comprising liquid crystal display elements, plasma display elements or CRT for informing a tire Wi of which the tire air-pressure has decreased and an initialization switch 4 which might be operated by a driver are connected to the control unit 2.

Figure 2:
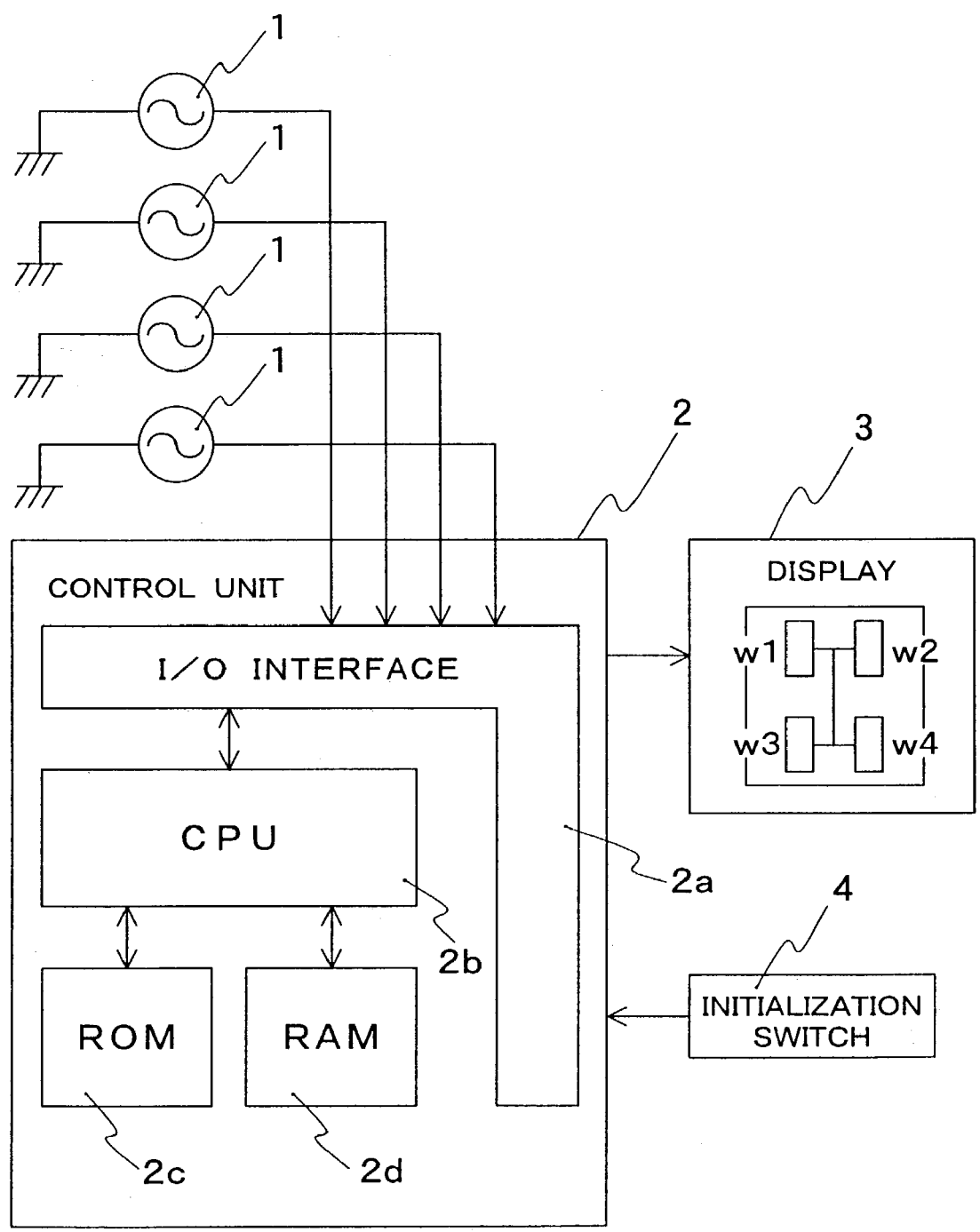
FIG. 2 is a block diagram illustrating electric arrangements of the apparatus for detecting decrease in tire air-pressure of FIG. 1.

As illustrated in FIG. 2, the control unit 2 comprises an I/O interface 2a required for sending/receiving signals to/from an external device, a CPU 2b which functions as a center of calculation, a ROM 2c which stores a control operation program for the CPU 2b, and a RAM 2d into which data are temporally written and are read out therefrom when the CPU 2b performs control operations.

Pulse signals corresponding to the rotational number of tires Wi (hereinafter referred to as "wheel speed pulse") are outputted from the wheel speed information detecting means 1. In the CPU 2b, rotational angular velocities $F_i$ for the respective tires Wi are calculated on the basis of the wheel speed pulses as outputted from the wheel speed information detecting means 1 at specified sampling periods $\Delta T(sec)$, for instance, $\Delta T=1$.

Since the tires Wi are manufactured to include variations (initial differences) within standards, effective rolling radii of the respective tires Wi (a value obtained by dividing a distance which has been traveled by a single rotation by $2\pi$) are not necessarily identical to each other even though all of the tires Wi are at normal internal pressure. This will result in variations in the rotational angular velocities $F_i$ of the respective tires Wi. Thus, corrected rotational angular velocities $F1_i$ are calculated to cancel variations owing to initial differences. More particularly, corrections are performed to satisfy $F1_1 = F_1$ $F1_2 = mF_2$ $F1_3 = F_3$ $F1_4 = nF_4$ The correction coefficients m and n are obtained as $m=F_1/F_2$ and $n=F_3/F_4$ on the basis of rotational angular velocities $F_i$ when the rotational angular velocities $F_i$ have been calculated on the premise that the vehicle is performing straight-ahead driving. Then, wheel speeds Vi of the respective tires are calculated on the basis of $F1_i$.

As stated in the descriptions of the prior art, since driving force is changed not only by velocity but also owing to gradients of road surfaces (uphill and downhill gradients of sloped roads) or accelerations/decelerations, it might happen that occasions at which decompression is judged are reduced when decompression of a tire is detected on the basis of simple correlation with the velocity alone.

In the present invention, it has thus been paid attention to the fact that the driving force is changed through gradients of road surfaces or accelerations/decelerations, and judgment of decompression is performed on the basis of a multiple correlation coefficient between velocity and driving force for a judged value of decompression.

For this purpose, the present embodiment is provided with the wheel speed information detecting means 1; a memory means which stores the wheel speed of the respective tires; a velocity calculating means which obtains a vehicle body velocity of the vehicle on the basis of the wheel speed; a vehicle information calculating means which obtains vehicle information of the vehicle during running; a judged value calculating means which calculates a judged value of decompression on the basis of wheel speed of the respective tires Wi; and a detecting means which detects decrease in air-pressure of a tire Wi upon calculating a multiple correlation coefficient for the judged value between the vehicle body velocity and the vehicle information and comparing the multiple correlation coefficient with a specified threshold.

Further, according to the program for judging decompression of a tire of this embodiment, a computer is made to function, for judging decrease in tire air-pressure, as the memory means which stores the wheel speed of the respective tires Wi; the velocity calculating means which obtains a vehicle body velocity of the vehicle on the basis of the wheel speed; the vehicle information calculating means which obtains vehicle information of the vehicle during running; the judged value calculating means which calculates a judged value of decompression on the basis of wheel speed of the respective tires Wi; and the detecting means which detects decrease in air-pressure of a tire Wi upon calculating a multiple correlation coefficient for the judged value between the vehicle body velocity and the vehicle information and comparing the multiple correlation coefficient with a specified threshold.

While driving force, wheel torque (running resistance) or slip rate are examples of the vehicle information, it is preferable to employ the wheel torque as the vehicle information upon regarding the load radius of the tire (dynamic load radius) to be constant or to employ the slip rate which is obtained from the ratio between wheel speeds of front and rear wheels as the vehicle information, since it is difficult to measure the driving force in a simple manner.

The wheel torque might also be obtained through calculation on the basis of engine torque, engine revolutions or the throttling degree of the accelerator.

For obtaining the judged value of decompression (DEL) for detecting decrease in air-pressure of the tire Wi, differences between two diagonal sums of, for instance, the front wheel tires and the rear wheel tires are compared, wherein a sum of signals of one pair of wheels located on one diagonal line is subtracted from a sum of signals of the other pair of wheels located on the other diagonal line, and a ratio of this obtained value to an average value of the two sums is obtained based on the following equation.

$$DEL=\{(F1+F4)/2-(F2+F3)/2\}/\{(F1+F2+F3+F4)/4\}\times 100(\%)$$

Here, F1 to F4 respectively denote the wheel speed of the front left tire, the front right tire, the rear left tire and the rear right tire.

Upon considering factors of the vehicle body velocity and vehicle information for this judged value, multiple correlation analysis is performed to analyze their respective correlations for calculating a multiple correlation coefficient. In one example for calculating such a multiple correlation coefficient, regression is performed on the basis of a plane $Y=b_1x_1+b_2x_2+b_0$ wherein $y_i$ is a DEL value accumulated during, for instance, one second, $x_{1i}$ is a square of an average velocity v, and $x_{2i}$ is a wheel torque. At this time, the multiple correlation coefficient R might be obtained from the following equation (1).

$$R = \sqrt{\frac{S_{YY}}{S_{yy}}} = \sqrt{\frac{\sum(Y-\bar{Y})^2}{\sum(y-\bar{y})^2}} \quad (1)$$

The specified threshold might be defined as $R \geq 0.8$.

It is preferable to perform correction upon preliminarily measuring influences of using tires in a mixed manner. More particularly, when tires of different specifications or tires of different degrees of wear are attached to the axle of the right and left wheels, it might happen that erroneous alarm is issued on the basis of a relative speed ratio (right and left ratio) of right and left tires of different types even though the tires are at normal internal pressure, and accordingly, the judged value is preliminarily corrected. It is therefore preferable that the present embodiment includes a correction means which corrects the relative speed ratio of the driving wheels or following wheels during running when the right and left tires of the driving wheels or the following wheels of the vehicle are tires of different types of which degrees of wear or front and rear rigidities differ from each other. It should be noted that the storing means stores information on relationships between relative speed ratios of the right and left tires of different types of the driving wheels or following wheels which have been preliminary set to be at normal internal pressure, and driving forces or vehicle body velocities.

The relative speed ratios of the driving wheels or the following wheels are corrected during running upon preliminarily storing, for instance, how the slip rates vary through the driving forces and relative speed ratios between different-typed right and left tires of the driving wheels, preliminarily storing relationships between relative speed ratios between different-typed right and left tires of the following wheels and vehicle body velocities, and upon preliminarily storing relationships among relative speed ratios between the different-typed right and left tires of the driving wheels, vehicle information and vehicle body velocities, when performing initialization through actual running, which is performed on, for instance, exchanging tires.

As explained so far, it is possible to accurately detect decompression of a tire when using the present invention. Erroneous alarm might be prevented by correcting relative speed ratios of driving wheels or following wheels during running when tires have been exchanged to tires of different types.

What is claimed is:

1. A method for detecting decrease in tire air-pressure in which decrease in internal pressure of a tire is detected on the basis of wheel speed information obtained from wheels attached to a vehicle, comprising the steps of: detecting wheel speed information of the respective tires; storing the wheel speed information of the respective tires; obtaining a vehicle body velocity of the vehicle on the basis of the wheel speed information; obtaining vehicle information of the vehicle during running including driving force, wheel torque or slip rate; calculating a judged value of decompression on the basis of wheel speed information of the respective tires; and detecting decrease in air-pressure of a tire upon calculating a multiple correlation coefficient for the judged value between the vehicle body velocity and the vehicle information and comparing the multiple correlation coefficient with a specified threshold.

2. The method of claim 1, wherein the judged value is a ratio of a value obtained by substracting a sum of signals of one pair of wheels located on one diagonal line from a sum of signals of the other pair of wheels located on the other diagonal line, to an average value of the two sums.

3. The method of any one of claims 1 to 2, wherein relative speed ratio of the driving wheels or following wheels during running is corrected when the right and left tires of the driving wheels or the following wheels of the vehicle are tires of different types of which degrees of wear or front and rear rigidities differ from each other.

4. An apparatus for detecting decrease in tire air-pressure in which decrease in internal pressure of a tire is detected on the basis of wheel speed information obtained from wheels attached to a vehicle, comprising: wheel speed information detecting means which detect wheel speed information of the respective tires; a memory means which stores the wheel speed information of the respective tires; a velocity calculating means which obtains a vehicle body velocity of the vehicle on the basis of the wheel speed information; a vehicle information calculating means that obtains vehicle information of the vehicle during running including driving force, wheel torque or slip rate; a judged value calculating means that calculates a judged value of decompression on the basis of wheel speed information of the respective tires; and a detecting means which detects decrease in air-pressure of a tire upon calculating a multiple correlation coefficient for the judged value between the vehicle body velocity and the vehicle information and comparing the multiple correlation coefficient with a specified threshold.

5. The apparatus of claim 4, wherein the judged value is a ratio of a value obtained by substracting a sum of signals of one pair of wheels located on one diagonal line from a sum of signals of the other pair of wheels located on the other diagonal line, to an average value of the two sums.

6. The apparatus of any one of claims 4 to 5, wherein the apparatus includes a correction means which corrects the relative speed ratio of the driving wheels or following wheels during running when the right and left tires of the driving wheels or the following wheels of the vehicle are tires of different types of which degrees of wear or front and rear rigidities differ from each other.

7. A program for judging decompression of a tire, wherein for judging decrease in tire air-pressure, a computer is made to function as a memory means which stores the wheel speed information of the respective tires; a velocity calculating means which obtains a vehicle body velocity of the vehicle on the basis of the wheel speed information; a vehicle information calculating means which obtains vehicle information of the vehicle during running including driving force, wheel torque or slip rate; a judged value calculating means which calculates a judged value of decompression on the basis of wheel speed information of the respective tires; and a detecting means which detects decrease in air-pressure of a tire upon calculating a multiple correlation coefficient for the judged value between the vehicle body velocity and the driving wheel and comparing the multiple correlation coefficient with a specified threshold.

8. The program of claim 7, wherein the computer is also made function as a correction means which corrects the relative speed ratio of the driving wheels or following wheels during running when the right and left tires of the driving wheels or the following wheels of the vehicle are tires of different types of which degrees of wear or front and rear rigidities differ from each other.

* * * * *